United States Patent Office 2,733,224
Patented Jan. 31, 1956

2,733,224
LIQUID POLISHING COMPOSITION

Thomas B. Smith and Rudolf E. Vetren, Chicago, Ill., assignors to Simoniz Company, a corporation of Delaware No Drawing. Application March 6, 1951,
Serial No. 214,226

6 Claims. (Cl. 260—26)

This invention relates to a liquid polishing composition and particularly to a composition comprising an emulsion of solid particles in water and having a small proportion of urea present.

Most of the liquid polishing compositions such as those which dry to a high gloss and are commonly called "self-polishing or no rubbing waxes" include an emulsion of particles of a wax polishing agent emulsified by means of emulsifying agents in a liquid comprising water. When these emulsions are frozen and subsequently thawed, the emulsion is often destroyed so that the solid particles settle out of the liquid. This breaking of the emulsion destroys the effectiveness of the liquid polish particularly when it is of the self-polishing type. One of the features of this invention is the provision of a stable polishing composition comprising an emulsion in a liquid carrier of particles comprising a wax polishing agent and urea dissolved in the liquid in an amount sufficient to inhibit precipitation of the particles on freezing and subsequent thawing of the composition. A more specific feature of the invention is the provision of such a polishing composition including the usual emulsifying agents, a plastic vinyl-type polymer emulsified in the liquid and a gloss promoting and hardening resin dissolved in the liquid with at least the major portion of the liquid being water. The composition of this invention is very resistant to breakdown on freezing although sometimes when the temperature is extremely low there may be a partial separation of emulsion particles on subsequent thawing but the composition will still be usable.

The principal constituent of the polishing composition of this invention is a wax or a mixture of waxes emulsified in water with the usual emulsifying agents such as soap and the like. In order to provide an improved gloss and to harden the wax film, a gloss promoting and hardening resin is preferably used dissolved in the liquid. This resin is preferably dissolved by means of a volatile alkali such as ammonia. The alkali is used to neutralize any acid present in the resin and a slight excess is employed to give a pH on the alkaline side. The liquid polishing composition also preferably employs a plastic vinyl-type resin emulsified in the liquid. This resin, which is plastic in the sense that it is deformable under pressure, aids in providing uniform wetting of the surface to which the composition is applied and also aids in spreading and leveling. The vinyl-type resin also contributes to the improved freeze resistance.

The liquid polishing composition of this invention preferably has a solids content of from 11.5 to 13.0% by weight of the composition with the preferred solids content being about 12.0%. The basic composition without the urea preferably has the following ranges of proportions:

| Liquid basis: | Dry basis, percent |
|---|---|
| Wax polishing agent 10 to 60% | 1.2–7.8 |
| Gloss promoting and hardening resin 15 to 40% | 1.7–5.2 |
| Plastic vinyl-type resin 25 to 50% | 2.8–6.5 |

The above percentages are by weight of the polishing composition. These compositions also include from 0.25 to 0.7% by weight of the composition of urea to give stability to freezing. The preferred proportion of urea is about 0.5%. Either the natural urea or the synthetic carbamide may be employed.

The wax polishing agent preferably has the following composition with the percentages being by weight of the agent:

| | Percent |
|---|---|
| Carnauba wax | 25–80 |
| Microcrystalline wax | 20–65 |
| Oxidized microcrystalline wax | 0–50 |

The microcrystalline wax may be "Mekon Y-20," "Barnsdall 190° amber," "Crown 1035" or "Crown 700," "Sunoco 985 yellow," or other similar waxes. The oxidized microcrystalline wax may be "Crown 23," "Cardis 319," or the like. The wax emulsion may be made with the ordinary emulsifying promoters. In a typical emulsion soap is employed to promote the formation of the emulsion, borax is used to aid the emulsification and sodium hydroxide is used to neutralize any acids that may be present. The caustic alkali is not absolutely necessary, however, and other emulsifying promoters may be used in place of the soap and borax. Typical soaps that may be employed are "Formula #25," and "Werkrite Flakes."

The gloss promoting and hardening resin contributes to good freeze resistance and also makes the wax film that is deposited harder and aids in producing a high gloss. The resins that may be used are all alkali soluble and a volatile alkali such as ammonia, morpholine, or alkylamines are used to solubilize the resin. Typical resins include "Amberol 750" consisting of a condensation product of maleic anhydride or fumaric anhydride with rosin and mixed polyhydroxy alcohols, "#3551" resin comprising a condensation product of maleic anhydride and pentaerythritol, and "#2694–C" resin comprising a condensation product of maleic anhydride and high molecular weight glycols. In preparing the solution of one of these resins, ammonia is preferably used in the form of a 2.5 to 3.5% solution of ammonia in water. Sufficient ammonia is employed to neutralize the acid and provide an excess of ammonia so that the resin solution has a pH above 7 and preferably between about 9 and 9.5. A suitable pH has been found to be about 9.3. As was pointed out above, other alkalis may be used in place of the ammonia.

The plastic vinyl-type resin is preferably used to give good wetting, spreading and leveling characteristics to the polishing composition. It also contributes materially to the freeze resistance of the composition. The vinyl-type polymers are prepared from vinyl compounds and are vinyl plastics as identified on page 696 of "The Condensed Chemical Dictionary," F. N. Turner, Editorial Director, published by Reinhold Publishing Corp., 1950. Typical resins that may be employed include "Lustrex Latex X-600," "Emulsion 70," and "Emulsion XE-40." These are all aqueous emulsions comprising emulsified polystyrene and are diluted with water to give the preferred solids content of about 11.5 to 13.0%.

In preparing the liquid polishing composition of this invention the wax emulsion, the gloss promoting and hardening resin solution and the plastic vinyl-type resin emulsion may be prepared separately with each having a solids content within the preferred range of 11.5 to 13.0% by weight. The three compositions may then be mixed together and the preferred amount of urea or carbamide dissolved therein. As was pointed out above, the preferred proportions are 10 to 60% by weight of the wax emulsion, 15 to 40% by weight of the gloss promoting and hardening resin, and 25 to 50% of the vinyl-type resin emulsion. The upper and lower limits of each of these ranges are somewhat approximate as compositions having proportions slightly outside these limits also prove useful. In general, however, amounts within these ranges produce polishing compositions giving the best general performance as to high gloss and freezing resistance. Thus compositions within the preferred ranges show superior water resistance, freeze resistance, stability, wear resistance of the resulting film and best wetting, leveling, spreading and gloss. When excessive amounts of the gloss promoting and hardening resin are used, the stability of the composition and the water resistance of the film become increasingly poor. Furthermore, the resulting film becomes too resinous and brittle and has relatively poor wear resistance. When too much of the vinyl-type polymer is employed, the wetting, spreading and leveling become poor, the freeze resistance decreases and the water resistance of the resulting film becomes increasingly poor. Furthermore, this film tends to be powdery and shows poor wear resistance. When too small an amount of the polymer is employed, the water resistance and the wear resistance of the resulting film are each poor and the film is too soft.

When an excessive amount of wax is used, the wear resistance of the resulting film is poor because the film tends to be too soft.

In one method of preparing the new liquid polishing composition of this invention the waxes are preferably melted together. The dry soap in flake form is then added to the melted waxes and dispersed therethrough while the waxes are melted. The sodium hydroxide and borax are simultaneously dissolved in 10 to 20 parts boiling water and this solution added with constant stirring to the mixture of wax and soap. After the resulting mixture has become thick the agitation is continued until the mixture becomes clear. Hot water, preferably, at 200 to 212° F., is added in small amounts with continued stirring until a phase inversion is achieved when the wax will be distributed through the water. More hot water is added in an amount sufficient to give a solids content of about 12.0% to the resulting emulsion. The emulsion is cooled to room temperature and constitutes the first portion of the composition. To the emulsified wax is then added with agitation a 12% solids content "Emulsion 70" which must be diluted with water of not over 100° F. temperature to achieve this 12% solids. A solution of "Amberol 750" is then prepared by adding the finely ground resin to aqueous ammonia solution and stirring until the resin is dissolved. Sufficient ammonia is used to give a final pH between 9 and 9.5 and preferably 9.3. The amount of water employed is such that the solids content is approximately 12% and the temperature of the water is preferably maintained at a maximum of 100° F. This "Amberol 750" solution is then added to the above mixture with stirring to attain uniform distribution and sufficient urea also dissolved in 10 to 20 parts of hot water is added to provide a concentration between about 0.25 and 0.70% with the preferred concentration of urea being about 0.5%. The water employed in making the above polishing composition is soft water.

A typical polishing composition is as follows:

| | Parts |
|---|---|
| Carnauba wax | 20 |
| "Crown 23" | 5 |
| "Mekon Y-20" | 20 |
| "Formula #25" | 7 |
| Borax | 2.15 |
| Sodium hydroxide | 0.15 |
| "Amberol 750" | 19.9 |
| 26 Bé. ammonia solution | 4.9 |
| "Emulsion 70" of 40% solids content | 100 |
| Urea | 4.5 |
| Water (soft) | 716.4 |

The above amounts are in parts by weigth and the composition is preferably prepared in the manner specified above in order to obtain a true emulsion of the waxes and the polymer.

Having described our invention in considerable detail, it our intention that the invention be not limited by the details of description but rather be construed broadly within its spirit and scope as set out in the accompanying claims.

We claim:
1. A stable polish, comprising: a freezable liquid carrier including water; about 1.2–7.8% by weight of wax; about 1.7–5.2% by weigth of a member of the class consisting of condensation products of maleic anhydride and rosin and polyhydric alcohols, condensation products of fumaric anhydride and rosin and polyhydric alcohols, condensation products of maleic anhydride and pentaerythritol and condensation products of maleic anhydride and high molecular weight glycols; about 2.8–6.5% by weigth of emulsified polystyrene; and from about 0.25–0.70% by weigth of urea dissolved in the liquid carrier to inhibit precipitation of the solids on freezing and subsequent thawing of the liquid.

2. A stable polish, comprising: a freezable liquid carrier including water; about 1.2–7.8% by weight of wax; about 1.7–5.2% by weight of a member of the class consisting of condensation products of maleic anhydride and rosin and polyhydric alcohols, condensation products of fumaric anhydride and rosin and polyhydric alcohols, condensation products of maleic anhydride and pentaerythritol and condensation products of maleic anhydride and high molecular weight glycols; about 2.8–6.5% by weight of emulsified polystyrene; and from about 0.25–0.70% by weight of urea dissolved in the liquid carrier to inhibit precipitation of the solids on freezing and subsequent thawing of the liquid, said polish having a solids content of about 11.5–13.0% by weight.

3. A stable polish, comprising: a freezable liquid carrier including water; about 1.2–7.8% by weight of wax including about 25–80 parts by weight of carnauba wax, about 0–50 parts by weight of oxidized microcrystalline wax and about 20–65 parts by weight of microcrystalline wax; about 1.7–5.2% by weight of a member of the class consisting of condensation products of maleic anhydride and rosin and polyhydric alcohols, condensation products of fumaric anhydride and rosin and polyhydric alcohols, condensation products of maleic anhydride and pentaerythritol and condensation products of maleic anhydride and high molecular weight glycols; about 2.8–6.5% by weight of emulsified polystyrene; and from about 0.25–0.70% by weight of urea dissolved in the liquid carrier to inhibit precipitation of the solids on freezing and subsequent thawing of the liquid.

4. A stable polish, comprising: about 10–60% by weight of a dispersion in water of about 11.5–13% wax; about 25–50% of a dispersion in water of about 11.5–13.0% of polystyrene; about 15–40% of a solution in water of about 11.5–13.0% by weight of a member of the class consisting of condensation products of maleic anhydride and rosin and polyhydric alcohols, condensation products of fumaric anhydride and rosin and polyhydric alcohols, condensation products of maleic anhydride and pentaerythritol and condensation products of maleic anhydride and high molecular weight glycols; and from about 0.25–0.70% by weight of urea to inhibit precipitation of the solids on freezing and subsequent thawing of the composition.

5. A stable polish, comprising: about 10–60% by weight of a dispersion in water of about 11.5–13% wax including about 25–80 parts by weight of carnauba wax, about 0–50 parts by weight of oxidized microcrystalline wax and about 20–65 parts by weight of microcrystalline wax; about 25–50% of a dispersion in water of about 11.5–13.0% of polystyrene; about 15–40% of a solution in water of about 11.5–13.0% by weight of a member of the class consisting of condensation products of maleic anhydride and rosin and polyhydric alcohols, condensation products of fumaric anyhydride and rosin and polyhydric alcohols, condensation products of maleic anhydride and pentaerythritol and condensation products of maleic anhydride and high molecular weight glycols; and from about 0.25–0.70% by weight of urea to inhibit precipitation of the solids on freezing and subsequent thawing of the composition.

6. A stable polish, comprising: about 45% by weight of a dispersion in water of about 11.5–13% wax including about 25–80 parts by weight of carnauba wax, about 0–50 parts by weight of oxidized microcrystalline wax and about 20–65 parts by weight of microcrystalline wax; about 37% of a dispersion in water of about 11.5–13.0% of polystyrene; about 18% of a solution in water of about 11.5–13.0% by weight of a member of the class consisting of condensation products of maleic anhydride and rosin and polyhydric alcohols, condensation products of fumaric anhydride and rosin and polyhydric alcohols, condensation products of maleic anhydride and pentaerythritol and condensation products of maleic anhydride and high molecular weight glycols; and about 0.5% by weight of urea to inhibit precipitation of the solids on freezing and subsequent thawing of the composiiton.

References Cited in the file of this patent

UNITED STATES PATENTS

| | | |
|---|---|---|
| 2,080,422 | Hoover | May 18, 1937 |
| 2,205,183 | Woodhouse | June 18, 1940 |
| 2,427,326 | Goodloe | Sept. 9, 1947 |
| 2,546,328 | Arabian et al. | Mar. 27, 1951 |
| 2,566,716 | Boe | Sept. 4, 1951 |
| 2,580,996 | Butler | Jan. 1, 1952 |

OTHER REFERENCES

"Synthetic Resins for Coatings," 1947, page 14. Resinous Products and Chemical Co.